(12) United States Patent
Ito

(10) Patent No.: US 9,126,503 B2
(45) Date of Patent: Sep. 8, 2015

(54) STOWABLE REAR SEAT

(75) Inventor: Teppei Ito, Shioya-gun (JP)

(73) Assignee: TS TECH CO., LTD., Asaka-shi, Saitama (JP)

(*) Notice: Subject to any disclaimer, the term of this patent is extended or adjusted under 35 U.S.C. 154(b) by 0 days.

(21) Appl. No.: 13/978,476

(22) PCT Filed: Dec. 28, 2011

(86) PCT No.: PCT/JP2011/080397
§ 371 (c)(1),
(2), (4) Date: Jul. 5, 2013

(87) PCT Pub. No.: WO2012/093634
PCT Pub. Date: Jul. 12, 2012

(65) Prior Publication Data
US 2013/0313849 A1    Nov. 28, 2013

(30) Foreign Application Priority Data
Jan. 7, 2011  (JP) ................... 2011-002369

(51) Int. Cl.
*B60N 2/015* (2006.01)
*B60N 2/30* (2006.01)
*B60N 2/36* (2006.01)

(52) U.S. Cl.
CPC .......... *B60N 2/01516* (2013.01); *B60N 2/0155* (2013.01); *B60N 2/305* (2013.01); *B60N 2/3013* (2013.01); *B60N 2/3065* (2013.01); *B60N 2/36* (2013.01)

(58) Field of Classification Search
CPC .. B60N 2/01516; B60N 2/155; B60N 2/3065; B60N 2/36; B60N 2/305
USPC ........................................................ 296/65.09
See application file for complete search history.

(56) References Cited

U.S. PATENT DOCUMENTS 6,817,646 B2 * 11/2004 Kikuchi et al. ............ 296/65.05
2004/0104590 A1   6/2004 Kikuchi et al.
2006/0145524 A1   7/2006 Fischer et al.

FOREIGN PATENT DOCUMENTS

CN      1535219 A    10/2004
CN      1651300 A     8/2005
(Continued)

OTHER PUBLICATIONS

Apr. 3, 2012 International Search Report issued in International Application No. PCT/JP2011/080397 (with translation).
(Continued)

*Primary Examiner* — Glenn Dayoan
*Assistant Examiner* — Melissa A Black
(74) *Attorney, Agent, or Firm* — Oliff PLC

(57) ABSTRACT

A stowable rear seat includes a seat back unit; and a seat cushion unit. The seat back unit includes a tiltable seat back erected on a floor surface; a seat back locking mechanism for locking a tilt of the seat back; and a rocking member rocking in cooperation with a tilting operation of the seat back after unlocking the seat back locking mechanism. The seat cushion unit includes a seat cushion horizontally placed on the floor surface in front of the seat back, the seat cushion being foldable on a foot floor surface at a lower position than the floor surface; a lock shaft provided at a back end of the seat cushion; and a seat cushion locking mechanism provided in the floor surface, the seat cushion locking mechanism engaging with the lock shaft to lock a horizontal state of the seat cushion on the floor surface.

10 Claims, 17 Drawing Sheets

(56) References Cited

FOREIGN PATENT DOCUMENTS

| | | |
|---|---|---|
| EP | 1393968 A2 | 3/2004 |
| JP | A-9-30303 | 2/1997 |
| JP | A-2000-108746 | 4/2000 |
| JP | A-2001-63419 | 3/2001 |
| JP | A-2001-219773 | 8/2001 |
| JP | A-2003-182423 | 7/2003 |
| JP | A-2004-066856 | 3/2004 |
| JP | A-2004-82823 | 3/2004 |
| JP | A-2005-247318 | 9/2005 |
| JP | A-2001-30815 | 2/2011 |
| WO | WO 2004/091963 A1 | 10/2004 |
| WO | 2009/147892 A1 | 12/2009 |

OTHER PUBLICATIONS

Jul. 3, 2014 European Search Report issued in Application No. 11854972.4.

Feb. 28, 2015 Office Action issued in Chinese Application No. 201180064299.1.

Sep. 9, 2014 Notification of Reasons for Refusal issued in Japanese Patent Application No. 2011-002369 (with translation).

Oct. 14, 2014 Notification of Reasons for Refusal issued in Japanese Patent Application No. 2011-002384 (with translation).

Oct. 21, 2014 Notification of Reasons for Refusal issue in Japanese Patent Application No. 2011-002375 (with translation).

* cited by examiner

FIG.11
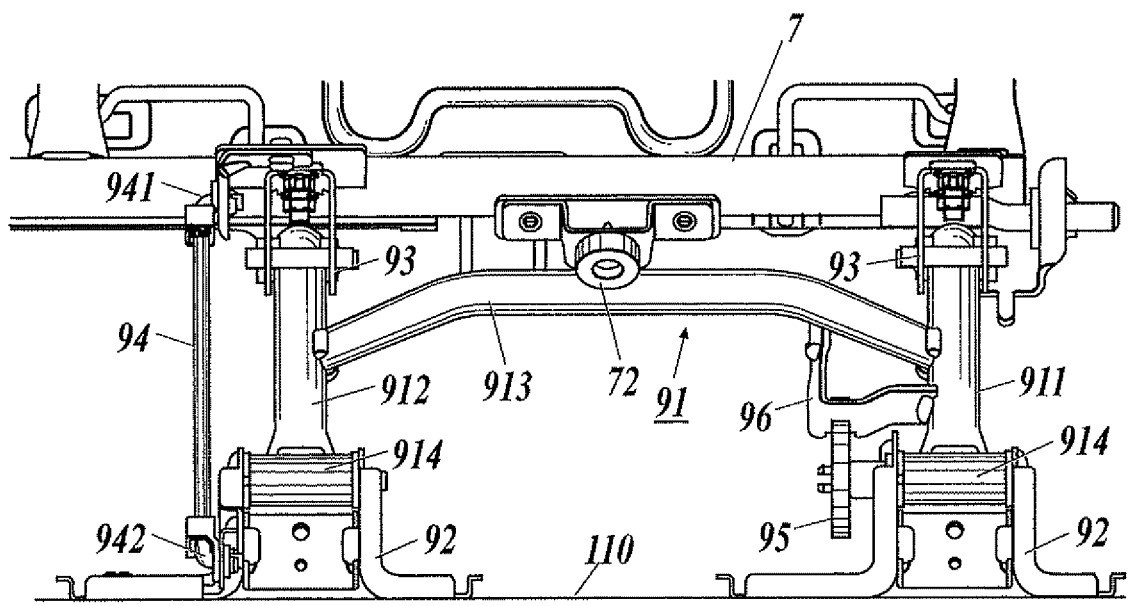
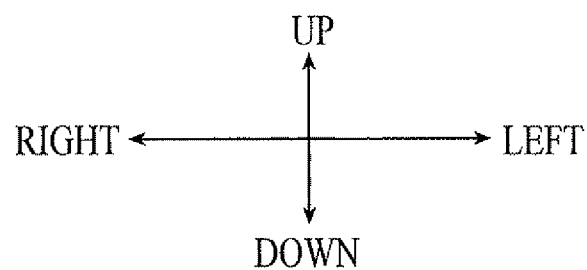

STOWABLE REAR SEAT

TECHNICAL FIELD

The present invention relates to a stowable rear seat.

BACKGROUND ART

Some conventional vehicles include stowable rear seats to extend the spaces of rear passenger rooms when no passengers sit (for example, refer to Patent Document 1). Such a stowable rear seat includes a seat cushion and a seat back. In a seatable state, the seat cushion is placed in a substantially horizontal posture relative to a floor surface while the seat back is positioned in an upright state at the rear of the seat cushion. In a stowed state, the seat cushion is placed on a foot floor surface at a lower position than the floor surface in a substantially horizontal posture while the seat back is folded in a substantially horizontal posture relative to the floor surface. In order to change the seatable state to the stowed state, a user releases the locks for the seat cushion and for the seat back and then moves the seat cushion to the foot floor surface and then tilts the seat back.

In recent years, mechanisms have been developed which move a seat cushion to a foot floor surface in cooperation with the tilting operation of a seat back.

PRIOR ART DOCUMENT

Patent Document

Patent Document 1: Japanese Unexamined Patent Application Publication No. Hei9-30303

SUMMARY OF INVENTION

Problems to be Solved by the Invention

If a vehicle collides head-on due to, for example, an accident, a luggage on a loading space behind the rear seat may clash against the back of a seat back. Such a collision from the back side may cause forward tilt and automatic reaction of the seat cushion in the above-described configuration including the seat cushion operating in cooperation with the tilting operation of the seat back.

Accordingly, it is an object of the present invention to provide a stowable rear seat that can prevent the reaction of the seat cushion even if the seat back is tilted due to collision with a luggage from the back side.

Means for Solving the Problem

In order to solve the above problem, the invention described in claim 1 is a stowable rear seat, including:
 a seat back unit; and
 a seat cushion unit, wherein
 the seat back unit including:
  a tiltable seat back body erecting on a floor surface;
  a seat back locking mechanism for locking a tilt of the seat back body; and
  a rocking member provided at a lower end of the seat back body, the rocking member rocking in an anteroposterior direction in cooperation with a tilting operation of the seat back body after unlocking of the seat back locking mechanism;
 the seat cushion unit including:
  a seat cushion body horizontally placed on the floor surface in front of the seat back body, the sat cushion body being foldable on a foot floor surface at a lower position than the floor surface;
  a lock shaft provided at a back end of the seat cushion body; and
  a seat cushion locking mechanism provided in the floor surface, the seat cushion locking mechanism engaging with the lock shaft to lock a horizontal state of the seat cushion body on the floor surface;
 the seat cushion locking mechanism including:
  a base plate having a cutout vertically extending and an upper part thereof opened such that the lock shaft is movable forward and backward;
  a regulation pawl rotatably attached to the base plate, rotated urged by the lock shaft entering the cutout, occluding an upside of the lock shaft after entry of the lock shaft up to a lower end of the cutout to regulate upward movement of the lock shaft and maintaining the horizontal state of the seat cushion body;
  a rachet unit rotatably attached to the base plate and engaging with the regulation pawl to thereby lock/release the regulated state of the regulation pawl; and
  an auxiliary cutout extending forward continuously from the cutout at the lower end of the cutout.

The invention described in claim 2 is the stowable rear seat according to claim 1, wherein the auxiliary cutout is parallel to a direction of a shock load from a back of the seat back body.

The invention described in claim 3 is the stowable rear seat according to either claim 1 or claim 2, wherein
 the base plates has a hamper for occluding the auxiliary cutout to prevent the lock shaft from entering the auxiliary cutout, and
 the hamper deforms due to a load equal to or greater than a predetermined level applied to the hamper and opens the auxiliary cutout.

The invention described in claim 4 is the stowable rear seat according to claim 3, wherein the hamper includes a plate spring projecting upward to occlude the auxiliary cutout.

The invention described in claim 5 is the stowable rear seat according to claim 4, wherein
 the hamper has an inverted V shape, and
 the hamper has one end fixed at the bottom of the base plate and the other end separated from the bottom of the base plate.

The invention described in claim 6 is the stowable rear seat according to claim 5, further including a detachment stopper for preventing detachment of the hamper from the base plate due to the deformation of the hamper.

The invention described in claim 7 is the stowable rear seat according to claim 1, wherein
 one pair of the seat back bodies is provided so as to be adjacent to each other at right and left;
 each of the paired seat back bodies including:
  a seat back frame; and
  hinge units provided in the right and left lower ends of the seat back frame, the hinge units being rotatably supported by the floor surface such that the seat back frame is tiltable, and
 each seat back frame of the paired seat back bodies has a reinforcing member provided thereto so as to surround the hinge unit adjacent to the other seat back body.

The invention described in claim 8 is the stowable rear seat according to claim 7, wherein
  each seat back frame of the paired seat back bodies has a pair of right and left wires for mounting a child safety seat,
  the wires of at least one seat back body of the paired seat back bodies being placed at the right and left lower ends of the seat back body, and
  the reinforcing member of at least one of the seat back bodies surrounds the wire adjacent to the other seat back body.

The invention described in claim 9 is the stowable rear seat according to claim 1, further including:
  a shift mechanism for shifting the seat cushion body between the horizontal state on the floor surface and a folded state on the foot floor surface, wherein
  the shift mechanism including:
    a pair of right and left legs rotatably attached to the seat cushion body and the foot floor surface, the paired legs rotating relative to the foot floor surface in the anteroposterior direction to support the seat cushion body so as to guide the seat cushion body between the horizontal state on the floor surface and the folded state on the foot floor surface; and
    a connection frame bridging the paired legs, and
  the connection frame curving so as to project forward in the horizontal state of the seat cushion body on the floor surface.

The invention described in claim 10 is the stowable rear seat according to claim 9, wherein
  the connection frame is attached in the longitudinal center of the paired legs, and
  both ends of the connection frame are fixed at the positions shifted in the projecting direction of the connection frame, from the center of the cross section orthogonal to the longitudinal direction of the legs.

Effects of Invention

According to the invention described in claim 1, the auxiliary cutout extends continuously from the lower end of the cutout; hence, the lock shaft enters the auxiliary cutout if a luggage clashes with the back side to move the entire rear seat forward. Since the upward movement of the lock shaft is regulated by the entry into the auxiliary cutout, the seat cushion body itself is also locked in the horizontal state. In this way, even if a luggage clashes with the back side to tilt the seat back body, the seat cushion body maintains the locked state. This can prevent unlocking in cooperation with the tilt of the seat back body.

According to the invention described in claim 2, the auxiliary cutout is parallel to a direction of a shock load from the back of the seat back body; hence, when the entire stowable rear seat moves forward in response to shock from the back, the lock shaft can easily be fit into the auxiliary cutout.

According to the invention described in claim 3, the hamper occluding the auxiliary cutout is provided to prevent the lock shaft from entering the auxiliary cutout; hence, the lock shaft can be prevented from entering the auxiliary cutout in a normal mode.

The hamper deforms and opens the auxiliary cutout if a load equal to or greater than the predetermined level is applied to the hamper due to shock such as collision; hence, the lock shaft can be fit into the auxiliary cutout to lock the seat cushion body only when a luggage clashes from behind from the back to tilt the seat back body.

According to the invention described in claim 4, the hamper includes a plate spring projecting upward to occlude the auxiliary cutout; hence, shock caused by a load smaller than the predetermined level is absorbable even if the lock shaft collides with the hamper due to a certain factors other than collision with the back side.

The predetermined load can be easily adjusted just by modifying the thickness or elastic modulus of the plate spring of the hamper.

According to the invention described in claim 5, the inverted V hamper has one end fixed at the center of the bottom of the base plate and the other end separated from the bottom of the base plate; hence, the deformation of the hamper due to collision with the lock shaft causes the contact of the other end with the bottom. This two-stage process can hold the lock shaft so as to prevent a load smaller than the predetermined level from opening the auxiliary cutout.

According to the invention described in claim 6, the detachment stopper prevents detachment of the hamper from the base plate due to the deformation of the hamper to reliably guide the contact between the other end of the hamper and the bottom of the base plate.

The inventor discovered that, if a luggage on a loading space behind a rear seat clashes against the back of a seat back due to head-on collision, the shock concentrates in the center of the rear seat. According to the invention described in claim 7, the seat back frames in the paired seat back bodies has the reinforcing members provided so as to surround the hinge units adjacent to the other seat back body, i.e., adjacent to the center of the vehicle; hence, shock caused by a luggage on the loading space clashing with the back side can be endured to secure the strength of the wall of the seat back unit.

According to the invention described in claim 8, the reinforcing member surrounds the wire adjacent to the other seat back body in the paired wires for mounting a child safety seat; hence, the strength of the wire can also be enhanced by the single reinforcing member.

According to the invention described in claim 9, the connection frame has a curved shape so as to project forward in the horizontal state of the seat cushion body on the floor surface; hence, the space at the center between the connection frame and the seat cushion body can be secured while the paired legs guide the seat cushion body from the horizontal state on the floor surface to the folded state on the foot floor surface. This configuration can prevent contact of the connection frame with the seat cushion body in a folding operation and perform a smooth folding operation for the seat cushion body.

According to the invention described in claim 10, the connection frame is fixed at the position shifted in the projecting direction of the connection frame, from the center of the cross section orthogonal to the longitudinal direction of the legs; hence, the connection frame can be attached to the legs more easily in the assembling work.

BRIEF DESCRIPTION OF DRAWINGS

[FIG. 11] This is a front view illustrating an outline configuration of a shift mechanism in a horizontal state of the seat cushion body according to the present embodiment.

DESCRIPTION OF EMBODIMENTS

Exemplary embodiments according to the present invention will now be described with reference to the accompanying drawings. Although various preferred technical limitations are applied to the following embodiments according to the present invention, the scope of the present invention should not be limited to these embodiments and examples illustrated in these drawings.

Figure 1:
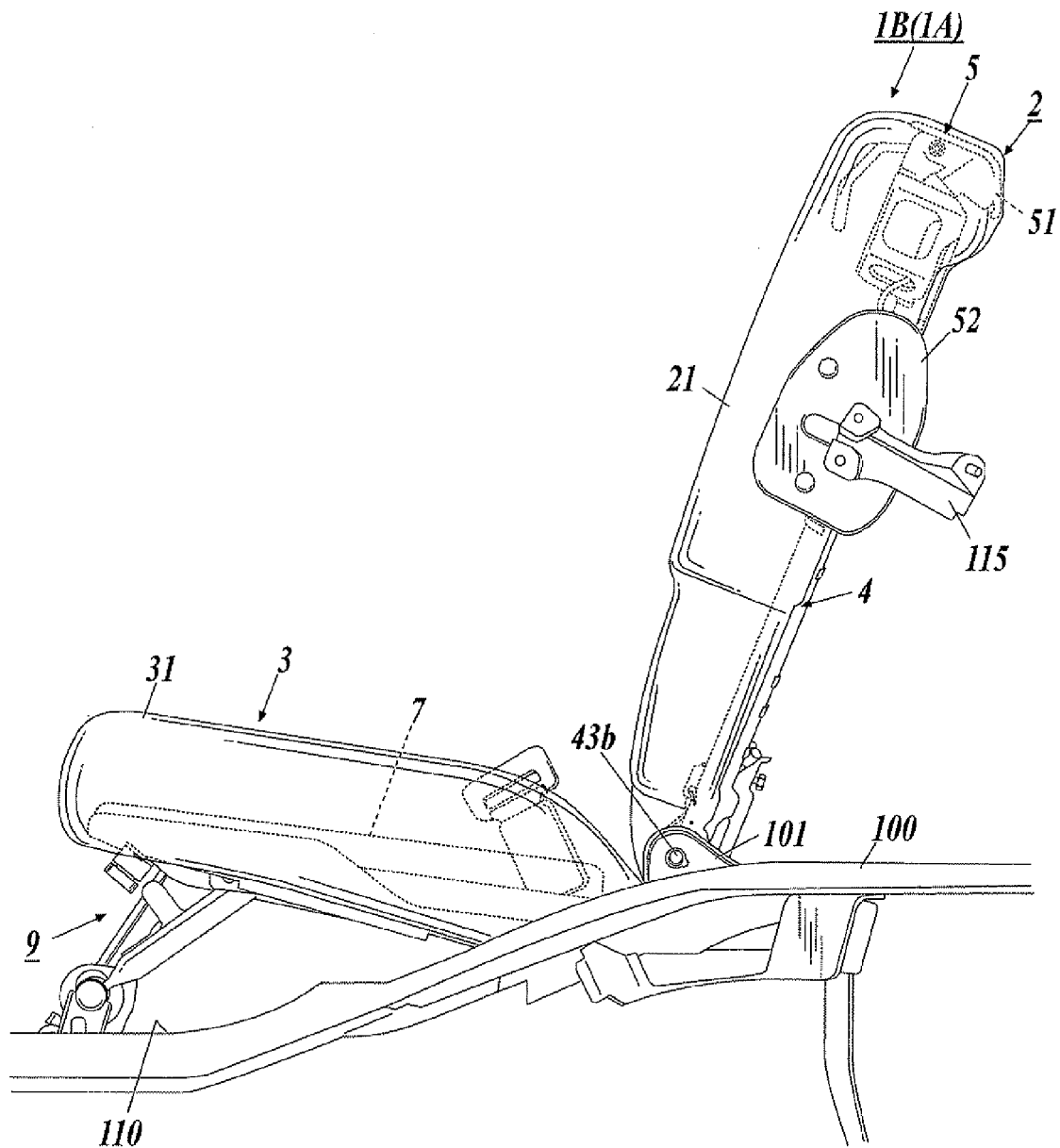
[FIG. 1] This is a side view illustrating an outline configuration of a stowable rear seat according to the present embodiment.
Figure 2:
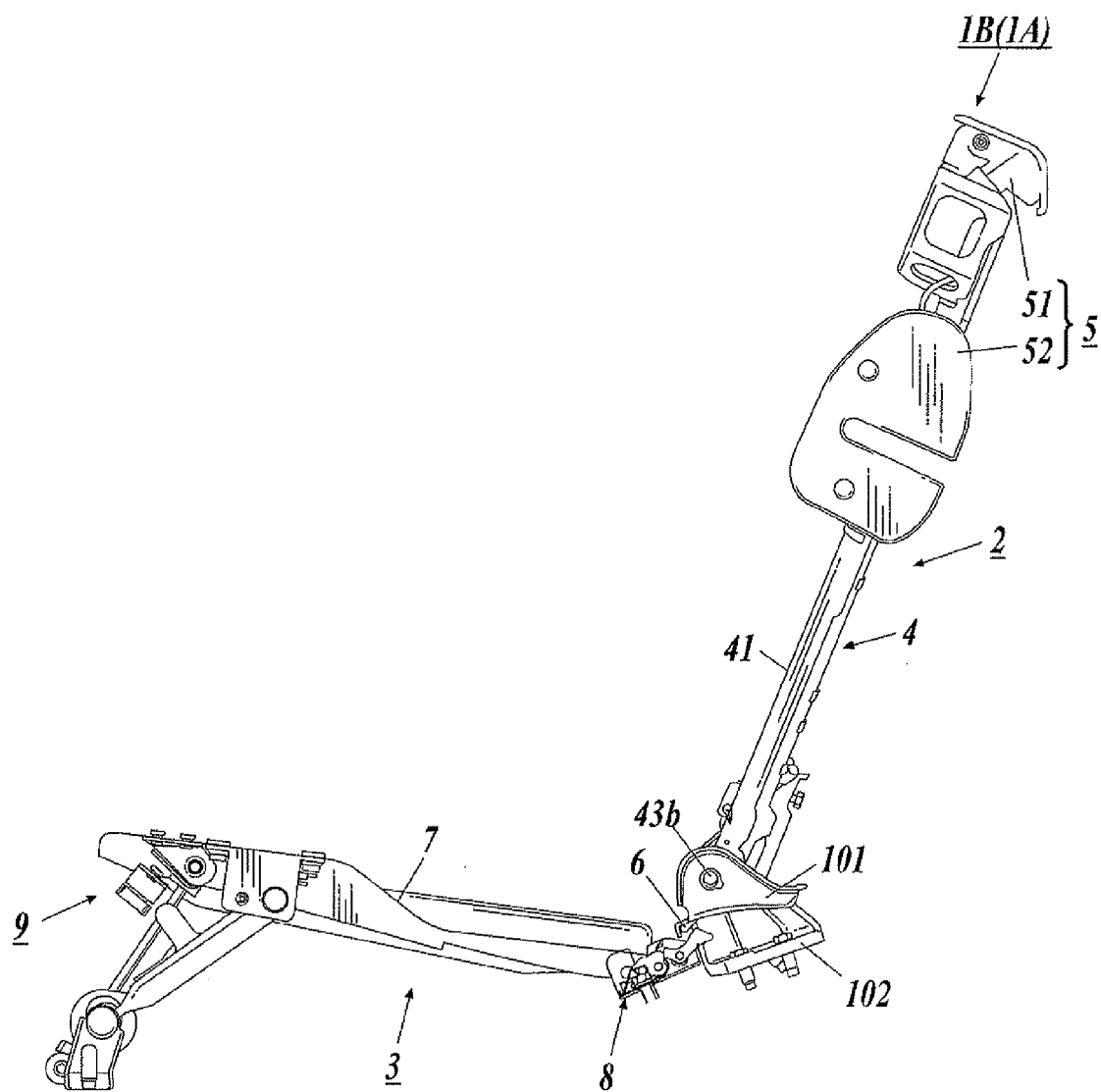
[FIG. 2] This is a side view illustrating an internal configuration of the stowable rear seat in FIG. 1.
Figure 3:
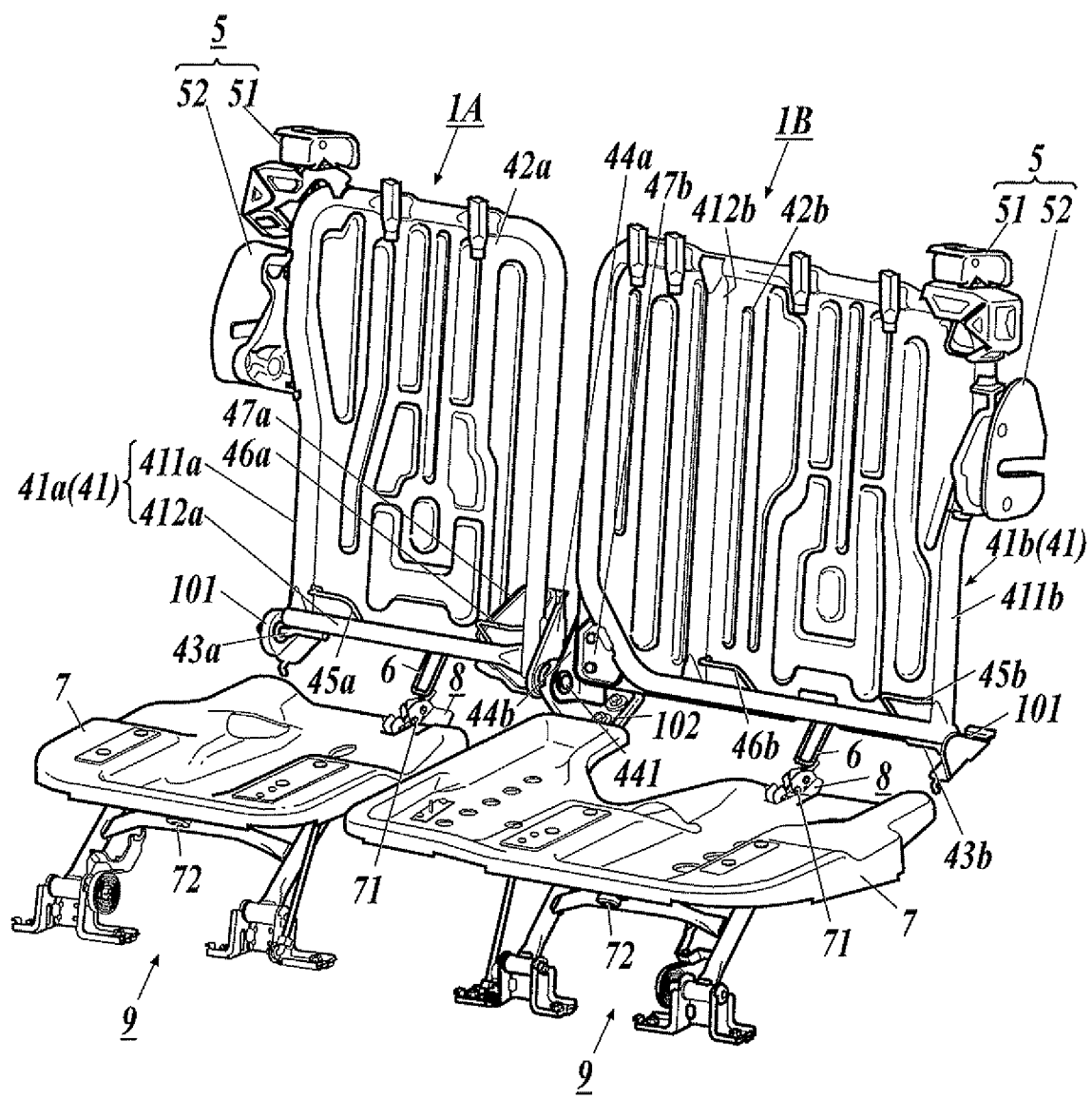
[FIG. 3] This is a perspective view illustrating the internal configuration of the stowable rear seat in FIG. 1.

FIG. 1 is a side view illustrating an outline configuration of a stowable rear seat according to the present embodiment. FIG. 2 is a side view illustrating an internal configuration of the stowable rear seat. FIG. 3 is a perspective view illustrating the internal configuration of the stowable rear seat. As illustrated in FIG. 3, a pair of right and left stowable rear seats 1A and 1B is provided so as to be stowable independently. The right stowable rear seat 1A has a smaller width than that of the left stowable rear seat 1B.

As illustrated in FIG. 1, the stowable rear seats 1A and 1B each include a seat back unit 2 and a seat cushion unit 3, which are covered with the seat pads 21 and 31, respectively.

The seat back unit 2 will now be described. The seat back unit 2 includes a tiltable seat back body 4 erecting on a floor surface 100 of a vehicle body and a seat back locking mechanism 5 locking the tilt of the seat back body 4.

As illustrated in FIGS. 2 and 3, the seat back body 4 includes a seat back frame 41 functioning as the outer periphery of the seat back body 4, a back board 42 attached to the seat back frame 41, and hinge units 43 and 44 provided in the right and left lower ends of the seat back frame 41. The hinge units are rotatably supported by the floor surface 100 such that the seat back frame 41 can be tilted.

The seat back frame 41 of the right stowable rear seat 1A has a different configuration from that of the left stowable rear seat 1B. The seat back frame 41a of the right stowable rear seat 1A will now be described.

As illustrated in FIG. 3, the right seat back frame 41a includes a first pipe unit 411a formed by bending a single pipe so as to surround the upper, right, and left sides of the back board 42a, and a second pipe unit 412a having a linear shape placed on the lower side of the back board 42a so as to be connected to both ends of the first pipe unit 411a. As a result, the entire seat back frame 41a surrounds the outer periphery of the back board 42a.

Wires 45a and 46a for mounting a child safety seat (not illustrated) are provided inside the right and left corners between the first and second pipe units 411a and 412a.

Among the hinge units 43a and 44a, the hinge unit 43a adjacent to the outside of the vehicle is a rotatable hinge shaft engaging with a support bracket 101 provided on the floor surface 100, and is welded to the second pipe unit 412a.

The other hinge unit 44a adjacent to the center of the vehicle is a rotatable hinge bracket engaging via a hinge shaft 441 with a center hinge bracket 102 provided on the floor surface 100. The hinge unit 44a is attached to the left lower corner of the back board 42a. A reinforcing member 47a is provided so as to surround the hinge unit 44a and the wire 46a in the left lower corner of the back board 42a.

Figure 4:
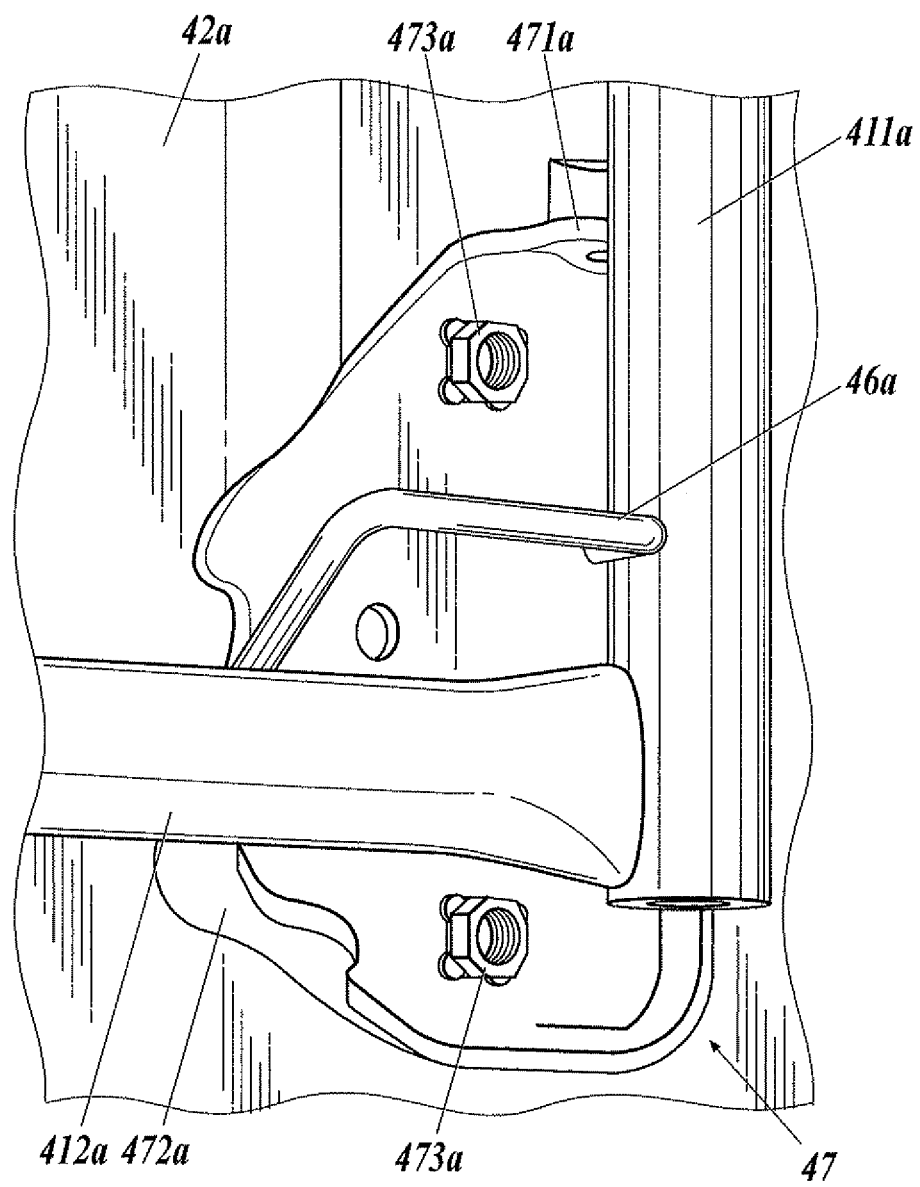
[FIG. 4] This is a perspective view illustrating an outline configuration of a reinforcing member according to the present embodiment.

FIG. 4 is a perspective view illustrating an outline configuration of the reinforcing member 47a.

The reinforcing member 47a has a larger thickness than that of the back board 42a and is welded to the first and second pipe units 411a and 412a. The welded portions 471a and 472a of the reinforcing member 47a has ribs to keep high welding strength. Screw units 473a for fixing the hinge 44a are provided in the upper and lower portions of the reinforcing member 47a. The hinge 44a is fixed to the back board 42a via the reinforcing member 47a to enhance the attachment strength of the hinge 44a.

The seat back frame 41b of the left stowable rear seat 1B will now be described.

As illustrated in FIG. 3, the left seat back frame 41b includes a pipe unit 411b formed by bending a single pipe so as to surround the entire periphery of the back board 42b. The pipe unit 411b is chamfered at its right lower corner and is bent to surround the back board 42b other than its right lower corner. Both ends of the pipe unit 411b are welded at the left lower corner of the back board 42b. A reinforcing pipe 412b bridges the upper and lower sides of the pipe unit 411b inside the pipe unit 411b.

In the left corner between the reinforcing pipe 412b and the lower side of the pipe unit 411b and in the corner between the left and lower sides of the pipe unit 411b, wires 45b and 46b are provided for mounting a child safety seat (not illustrated).

Among hinge units 43b and 44b, the hinge unit 43b adjacent to the outside of the vehicle is a rotatable hinge shaft engaging with a support bracket 101 provided on the floor surface 100, and is welded to the left lower corner of the pipe unit 411b.

The other hinge unit 44b adjacent to the center of the vehicle is a rotatable hinge bracket engaging via a hinge shaft 441 with a center hinge bracket 102 provided on the floor surface 100. The hinge unit 44b is attached to the right lower corner of the back board 42b. A reinforcing member 47b is provided so as to surround the hinge unit 44b in the left lower corner of the back board 42b.

Figure 5:
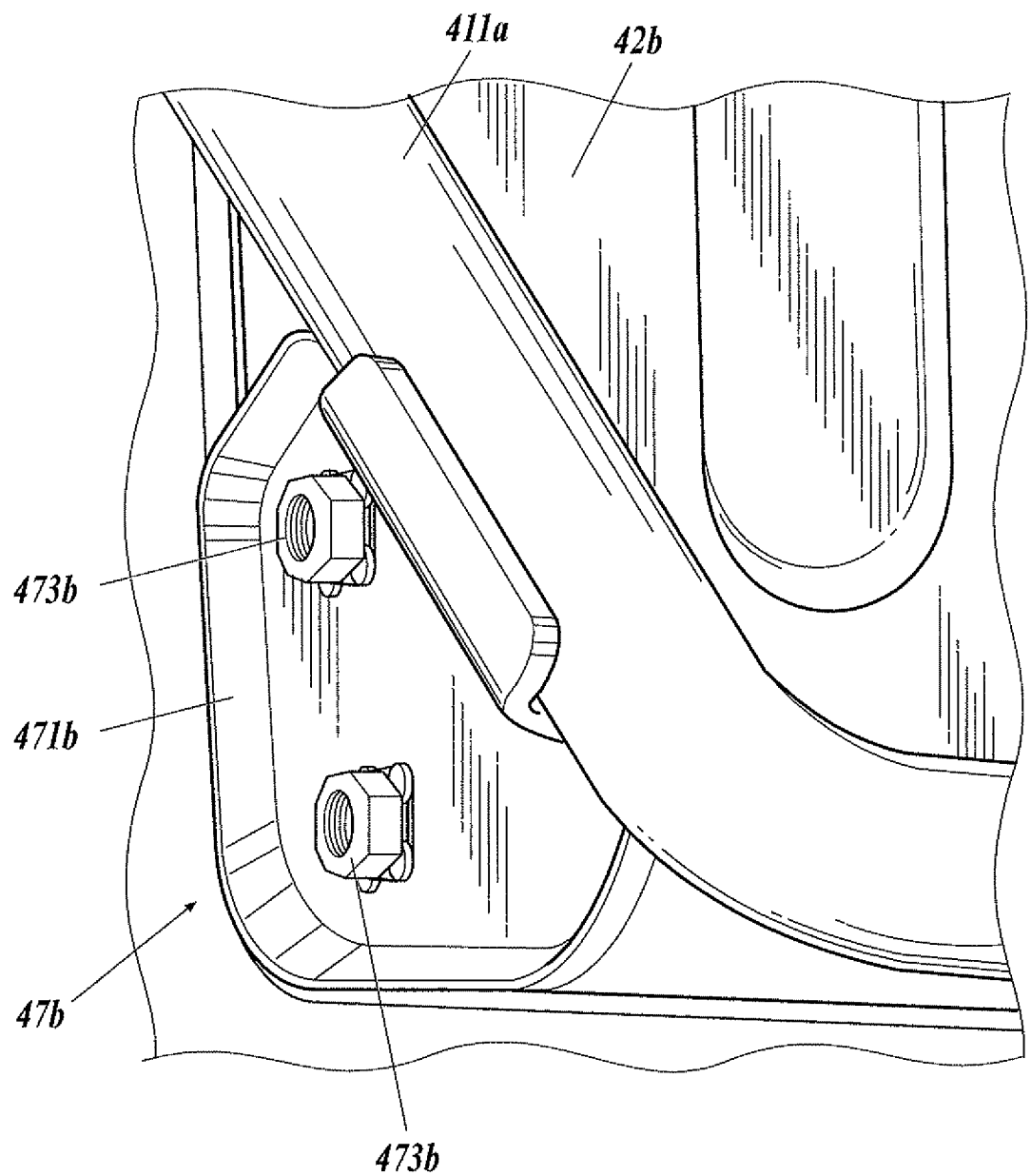
[FIG. 5] This is a perspective view illustrating an outline configuration of another reinforcing member according to the present embodiment.

FIG. 5 is a perspective view illustrating an outline configuration of the reinforcing member 47b.

The reinforcing member 47b has a larger thickness than that of the back board 42b and is welded to the right lower corner of the pipe unit 411b. The reinforcing member 47b has a rib 471b along its entire periphery to enhance its overall strength. Screw units 473b for fixing the hinge unit 44b are provided in the upper and lower portions of the reinforcing member 47b. The hinge unit 44b is fixed to the back board 42b via the reinforcing member 47b to enhance the attachment strength of the hinge unit 44b.

As illustrated in FIG. 3, the seat back locking mechanism 5 includes a lever 51 provided on the upper outside of the seat back body 4, and a lock unit 52 provided on the outside of the seat back body 4 and engaging with a latched portion 115 (refer to FIG. 1) of a vehicle body. In an upright state of the seat back body 4, the lock unit 52 engages with the latched portion of the vehicle body and locks the upright state. In response to the operation of the lever 51, the locking between the lock unit 52 and the latched portion is released to shift the seat back body 4 to a tiltable state.

Below each of the seat back bodies 4 of the right and left stowable rear seats 1A and 1B, a rocking member 6 is provided to rock in the anteroposterior direction in cooperation with a tilting operation of the seat back body 4 after unlocking of the seat back locking mechanism 5. The rocking member 6 is formed by bending a metal rod into a rectangle frame extending downward. The rocking member 6 is welded at a substantial center of each of the second pipe unit 412a and the pipe unit 411b.

Each seat cushion unit 3 includes a seat cushion body 7, a seat cushion locking mechanism 8, and a shift mechanism 9. In these components, only the seat cushion bodies 7 have different widths between the right and left stowable rear seats 1A and 1B while the seat cushion locking mechanisms 8 and the shift mechanisms 9 have the same configurations in the right and left stowable rear seats 1A and 1B.

Each seat cushion body 7 is horizontally placed on the floor surface 100 in front of the seat back body 4 and is foldable on a foot floor surface 110 at a lower position than the floor surface 100. Hereafter, a state of the seat cushion body 7 positioned horizontally on the floor surface 100 is called a horizontal state, and a state of the seat cushion body 7 folded on the foot floor surface 110 is called a folded state. In the center back end of the seat cushion body 7, a lock shaft 71 engaging with the seat cushion locking mechanism 8 extends in the lateral direction. On the front undersurface of the seat cushion body 7, a posture maintaining unit 72 is provided to maintain the posture of the seat cushion body 7 in contact with the foot floor surface 110 in the folded state.

As illustrated in FIG. 3, the seat cushion locking mechanism 8 is provided in the floor surface 100 so as to be placed below the seat back body 4 and in the back side of the seat cushion body 7 in the horizontal state. The seat cushion locking mechanism 8 can engage with the lock shaft 71 to lock the horizontal state of the seat cushion body 7.

Figure 6:
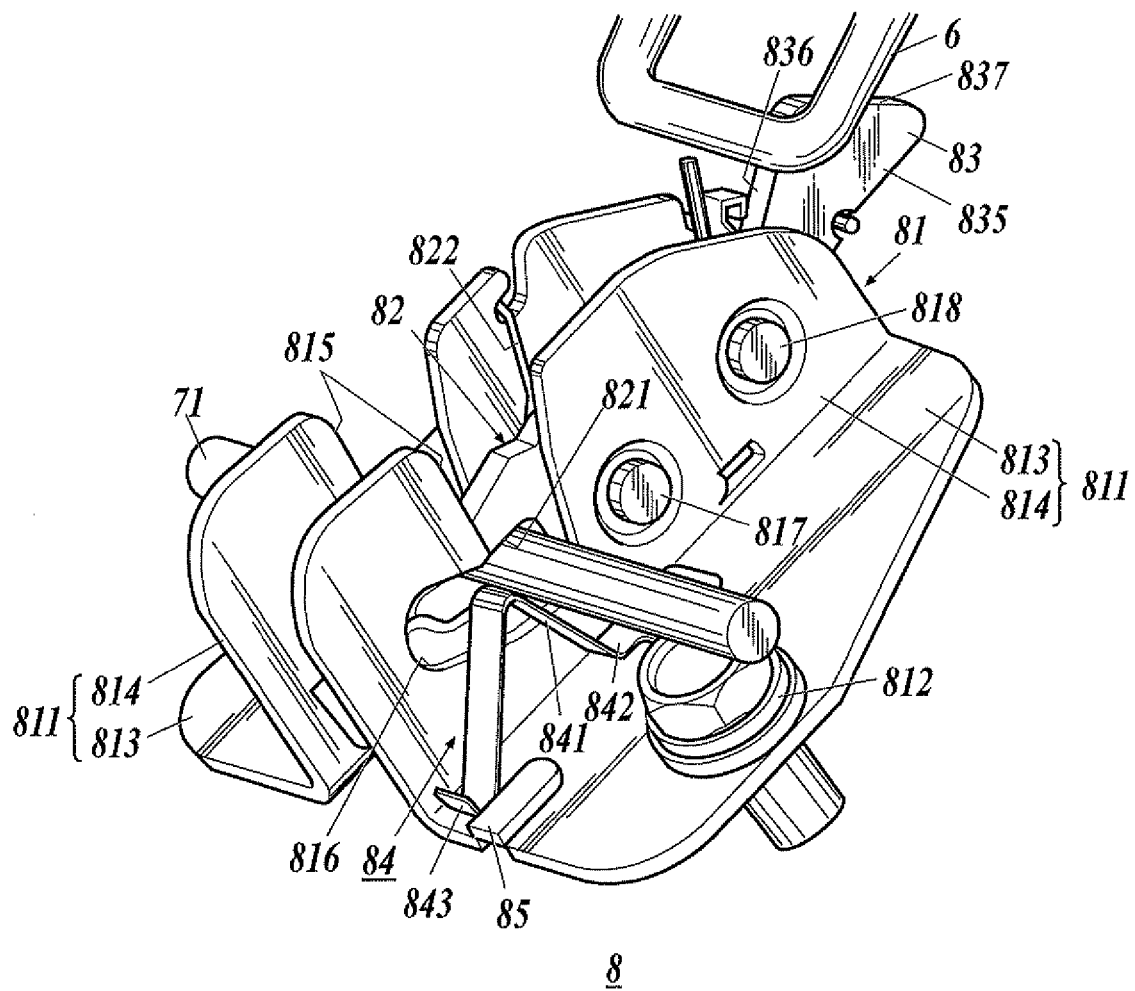
[FIG. 6] This is a perspective view illustrating an outline configuration of a seat cushion locking mechanism according to the present embodiment.
Figure 7:
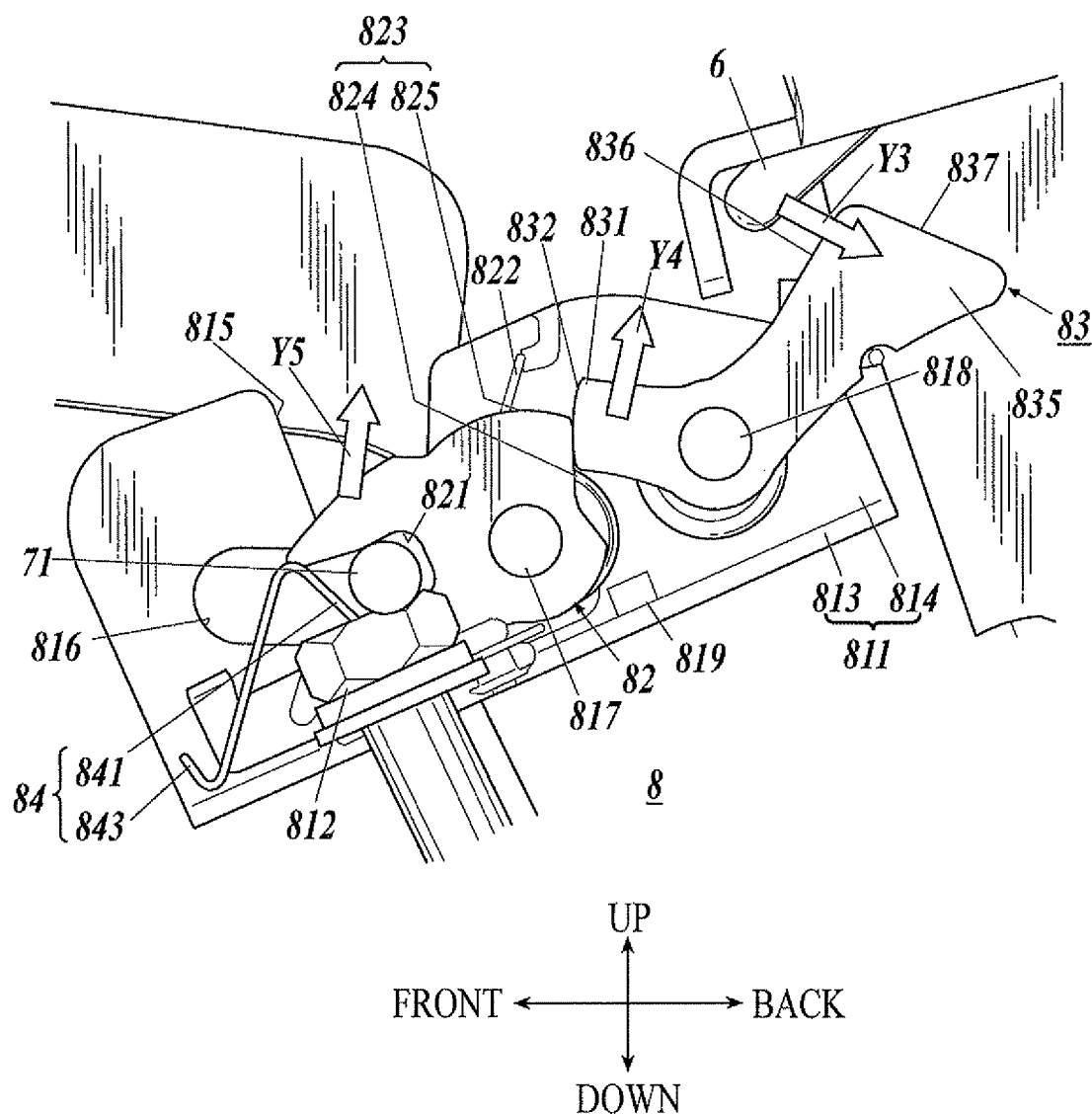
[FIG. 7] This is a side view illustrating an outline configuration of the seat cushion locking mechanism according to the present embodiment.

The seat cushion locking mechanism 8 will now be explained in detail. FIGS. 6 and 7 are a perspective view and a side view respectively that illustrate an outline configuration of the seat cushion locking mechanism 8. As illustrated in FIGS. 6 and 7, the seat cushion locking mechanism 8 includes base plates 81, a regulation pawl 82, and a rachet unit 83.

The base plates 81 include a pair of right and left plate boards 811 each having a bottom 813 fixed to the floor surface 100 with a screw 812 and a plate body 814 erecting from the inner side of the bottom 813. The plate body 814 has a cutout 815 vertically extending and the upper part thereof is opened.

Figure 8:
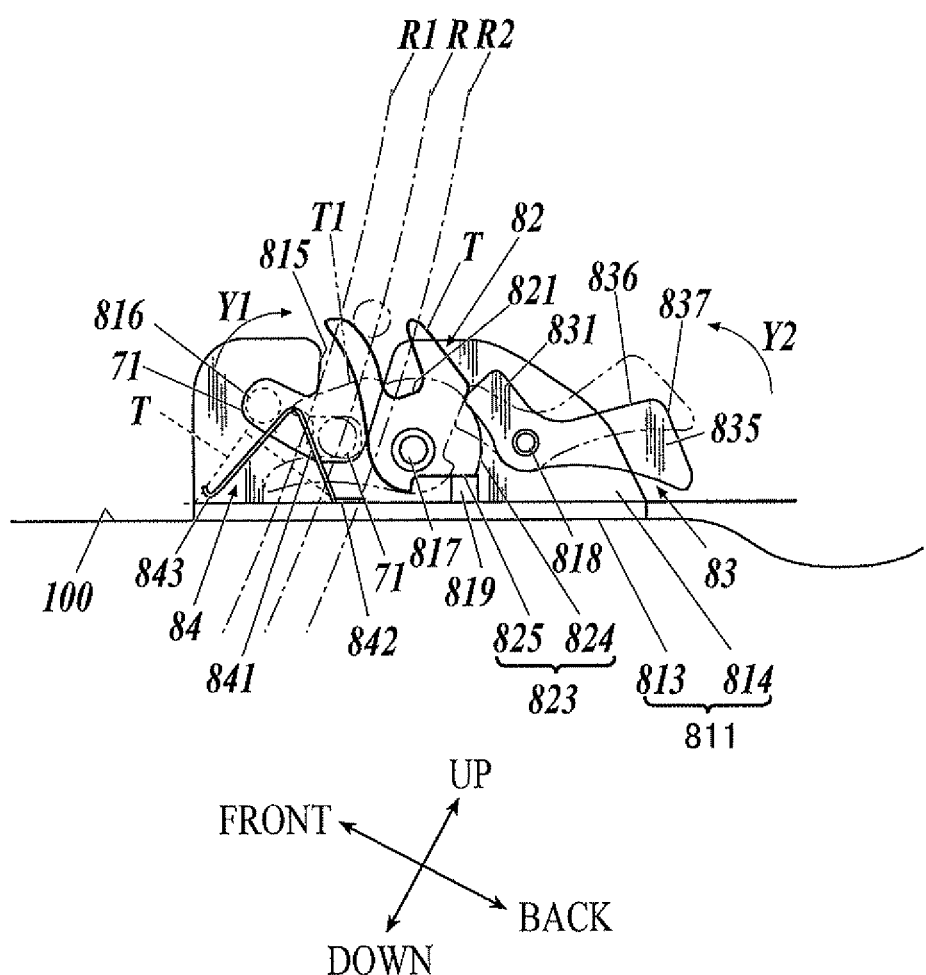
[FIG. 8] This is a side view illustrating the relationship between a locus of a lock shaft and a regulation pawl according to the present embodiment.

FIG. 8 is a side view illustrating the relationship between a locus R of a lock shaft 71 and the regulation pawl 82. As illustrated in FIG. 8, the cutout 815 is provided along the locus R of the lock shaft 71. Upon shifting between the horizontal state and the folded state of the seat cushion body 7, the lock shaft 71 moves forward or backward within the cutout 815. Lines R1 and R2 in FIG. 8 indicate a variation in the locus R of the lock shaft 71. The width of the cutout 815 is determined such that the lock shaft 71 can fit in despite slight shift of the locus R in the anteroposterior direction. At the lower end of the cutout 815, an auxiliary cutout 816 extends forward continuously from the cutout 815.

Behind the cutout 815, a first rotational shaft 817 rotatably holding the regulation pawl 82 and a second rotational shaft 818 rotatably holding the rachet unit 83 bridge between the paired base plates 81.

At the bottom 813 of at least one of the paired base plates 81, a hamper 84 occluding the auxiliary cutout 816 is provided to prevent the lock shaft 71 from entering the auxiliary cutout 816. The hamper 84 is an inverted V plate spring. The hamper 84 is placed in the anteroposterior direction so that one side 841 of the inverted V-shape occludes a portion of the auxiliary cutout 816 adjacent to the cutout 815. One end 842 of the hamper 84 is fixed at the center of the bottom 813 of the base plate 81 while the other end 843 is separated from the bottom 813. For example, if luggage on a loading space collides with the seat back body 4 from the back due to head-on collision, the lock shaft 71 comes into contact with the side 841 of the hamper 84. If a greater load which is equal to or greater than a predetermined level is applied to the hamper 84 at this time, the hamper 84 deforms and opens the auxiliary cutout 816 (refer to a dotted line T in FIG. 8). A predetermined load required for deforming the hamper 84 can be adjusted through the modification of the thickness or elastic modulus of the plate spring of the hamper 84.

A detachment stopper 85 is attached on the bottom 813 of the base plate 81 for preventing the detachment of the hamper 84 from the plate body 814 of the base plate 81 due to the deformation of the hamper 84. The detachment stopper 85 is a plate that extends in the anteroposterior direction beside the other end 843 of the hamper 84. The other end 843 of the hamper 84 is disposed between the plate body 814 and the detachment stopper 85. If the hamper 84 deforms to move in the anteroposterior direction, the detachment stopper 85 prevents the hamper 84 from shifting in the direction away from the plate body 814.

If a luggage clashes with the back side of the stowable rear seats 1A and 1B to move the entire rear seats forward, the lock shaft 71 deforms the hamper 84 to enter the auxiliary cutout 816. Since the upward movement of the lock shaft 71 is regulated by the entry into the auxiliary cutout 816, the seat cushion body 7 itself is also locked in the horizontal state. In this way, even if a luggage clashes with the back side to tilt the seat back body 4, the seat cushion body maintains the locked state. This can prevent unlocking in cooperation with the tilt of the seat back body 4.

The regulation pawl 82 is rotatably attached to the base plate 81 by the first rotational shaft 817. The regulation pawl 82 has a concave portion 821 at its tip to engage with the lock shaft 71. A state of the lock shaft 71 engaged into the concave portion 821 and the tip oriented to the substantial front is called a regulated state (refer to a chain line T1 illustrated in FIG. 8). A state of the lock shaft 71 detached from the inside of the concave portion 821 and the tip oriented to the substantial upside is called a released state (refer to a solid line T2 illustrated in FIG. 8). The regulation pawl 82 is always urged by a urging force applied by the urging spring 822 in a direction Y1 enabling the released state.

The base end of the regulation pawl 82 has a cam surface 823 to engage with the rachet unit 83. The cam surface 823 includes a first arcuate cam surface 824 and a second flat cam surface 825 continuously extending downward from the first cam surface 824. In the regulated state, the second cam surface 825 is latched by the rachet unit 83 to regulate further rotation caused by the urging spring 822. In the released state, the second cam surface 825 is latched by a stopper 819 provided on the bottom 813 of the base plate 81 to regulate further rotation caused by the urging spring 822.

If the lock shaft 71 guided by the cutout 815 engages with the concave portion 821 of the regulation pawl 82 in the released state, the regulation pawl 82 is rotated urged by the lock shaft 71. This rotation causes the regulation pawl 82 to occlude the upside of the lock shaft 71, regulating the upward movement of the lock shaft 71 to lead to the regulated state. At this time, the regulated state is locked by the rachet unit 83.

The rachet unit 83 is rotatably attached to the base plate 81 by the second rotational shaft 818. The rachet unit 83 engages with the regulation pawl 82 to thereby lock/release the regulated state of the regulation pawl 82. The end 831 of the rachet unit 83 engages with the cam surface 823 of the regulation pawl 82 and has an end surface functioning as the cam surface 832. The rachet unit 83 is always urged in a direction Y2 locking the regulation pawl 82 by an urging spring (not illustrated).

Figure 9A:
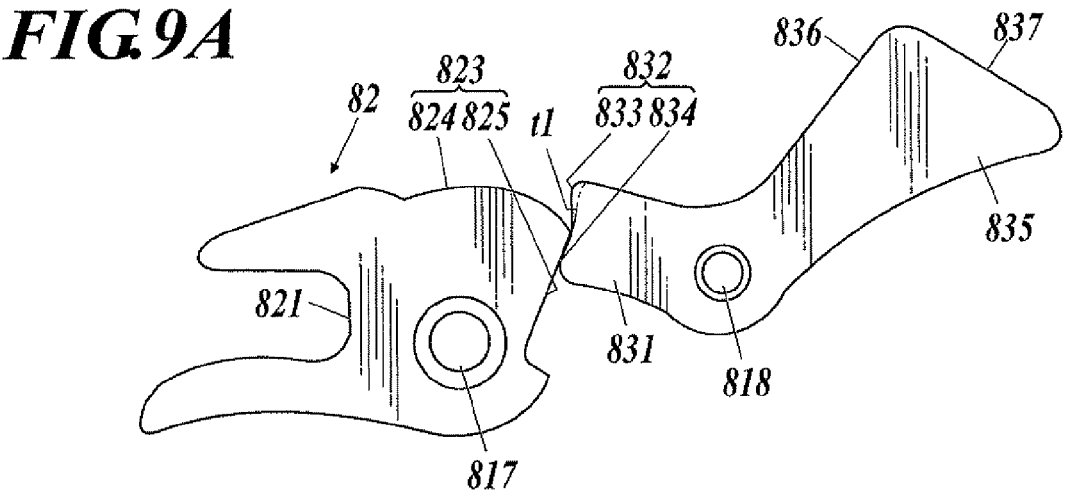
[FIG. 9A] This is a schematic diagram illustrating the relationship between a cam surface of a rachet unit and a cam surface of the regulation pawl according to the present embodiment.
Figure 9B:
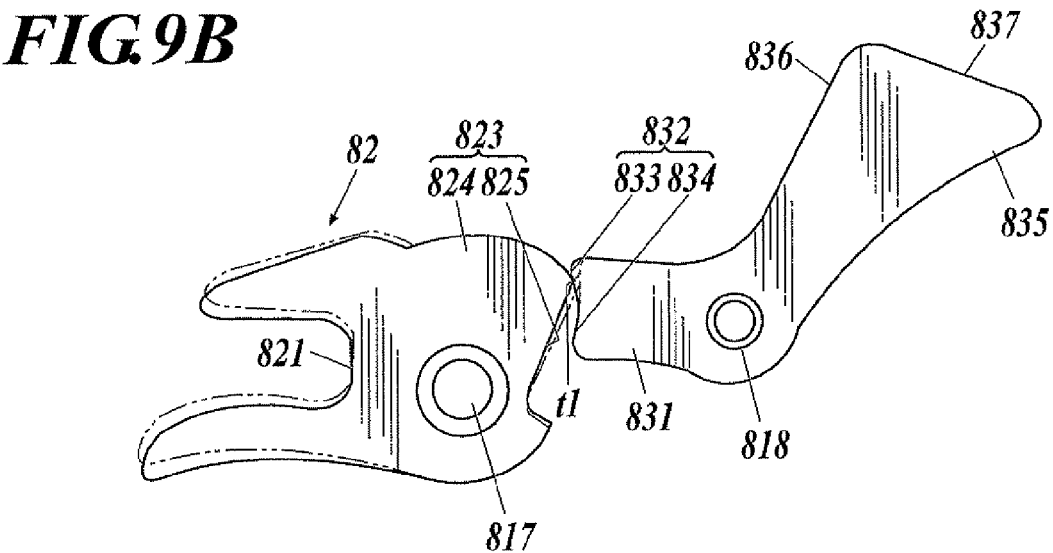
[FIG. 9B] This is a schematic diagram illustrating the relationship between the cam surface of the rachet unit and the cam surface of the regulation pawl according to the present embodiment.
Figure 9C:
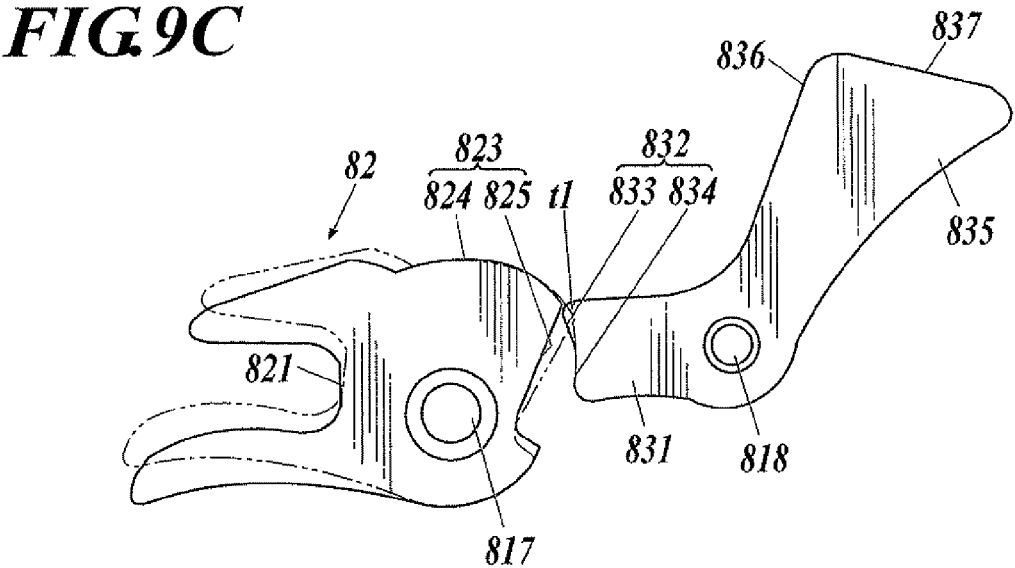
[FIG. 9C] This is a schematic diagram illustrating the relationship between the cam surface of the rachet unit and the cam surface of the regulation pawl according to the present embodiment.

FIG. 9 shows schematic diagrams illustrating the relationship between the cam surface 832 of the rachet unit 83 and the cam surface 823 of the regulation pawl 82. The cam surface 832 of the rachet unit 83 has an upper portion 833 inclined so as to project from a lower portion 834 towards the regulation pawl 82. During the rotation of the regulation pawl from the released state to the regulated state, the engagement position of the cam surface 832 of the rachet unit 83 shifts from the first cam surface 824 to the second cam surface 825 of the regulation pawl 82, as illustrated in FIG. 9A. At this time, if the cam surface 832 of the rachet unit 83 is flat, the rotation path of the regulation pawls 82 after the shift is indicated by two-dot chain lines t1 in FIGS. 9B and 9C. If the upper portion 833 of the cam surface 832 of the rachet unit 83 is further inclined so as to project from the lower portion 834 towards the regulation pawl 82 as described above, the regulation pawls 82 after the shifting is further rotated along the rotation path than those indicated by the two-dot chain lines t1 in FIGS. 9B and 9C. That is, the rachet unit 83 pushes the regulation pawl 82 toward the cutout 815 to lock the regulated state of the regulation pawl 82, enabling a more robust regulated state.

Figure 10:
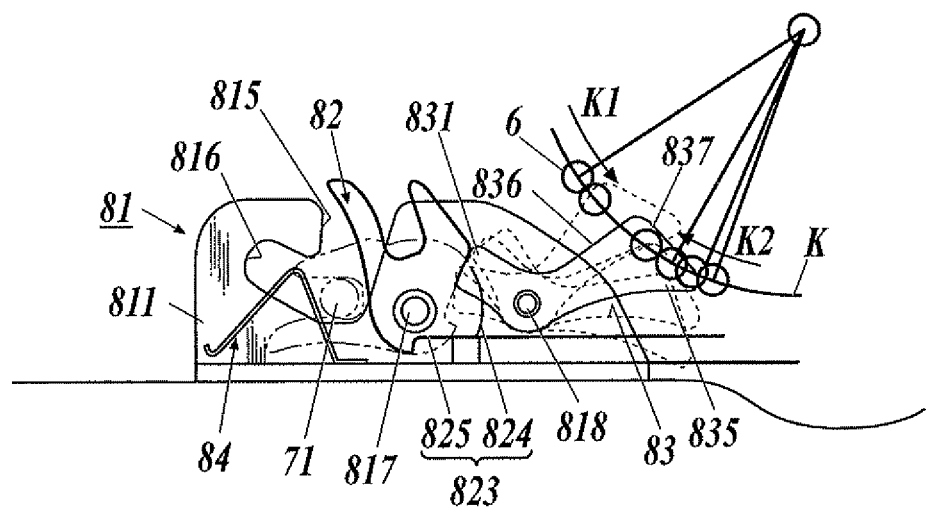
[FIG. 10] This is a side view illustrating the relationship between the rocking path of the rocking member and the rachet unit according to the present embodiment.

FIG. 10 is a side view illustrating the relationship between the rocking path K of the rocking member 6 and the rachet unit 83. As illustrated in FIG. 10, the other end 835 of the rachet unit 83 is placed on the rocking path K of the rocking member 6. In the other end 835 including the upper surface having a substantially inverted V-shape, the inner surface is called a first urging surface 836, and the outer surface is called a second urging surface 837. When the seat back body 4 is tilted from the upright state, the first urging surface 836 traverses the rocking path K1 of the rocking member 6 in the tilted state so as to be pushed by the rocking member 6. In contrast, when the seat back body 4 erects from the tilted state, the second urging surface 837 traverses the rocking path K2 of the rocking member 6 in the upright state so as to be pushed by the rocking member 6. The first and second urging surfaces 836 and 837 urged by the rocking member 6 rotate the rachet unit 83 in a direction opposite to the urged direction Y2 to retract the rachet unit 83 from the rocking path K. As a result, the rachet unit 83 can be retracted from the rocking path K when the seat back body 4 is tilted from the upright state or when it erects from the tilted state. In other words, even if the rocking member 6 contacts the other end 835 of the rachet unit 83 on the rocking path K during the erection of the seat back body 4 from the tilted state, the rachet unit 83 can be smoothly retracted from the rocking path K and enables a smooth erection operation.

In the upright state of the seat back body 4, the rocking member 6 is detached from the rachet unit 83 of the seat cushion locking mechanism 8. When the seat back body 4 is to be tilted, the rocking member 6 contacts the other end 835 of the rachet unit 83 and releases the lock of the seat cushion locking mechanism 8.

As illustrated in FIG. 7, the regulation pawl 82 in the regulated state is locked since the second cam surface 825 of the regulation pawl 82 engages with the cam surface 832 of the rachet unit 83. When the seat back body 4 is tilted from the upright state in the locked state, the rocking member 6 rocks in the direction of an arrow Y3, urges the first urging surface 836 of the rachet unit 83 against the urging force of the urging spring, and rotates the rachet unit 83 in the direction of an arrow Y4. This rotation releases the lock to rotate the regulation pawl 82 due to the urging force of the urging spring 822, releases the regulation of the lock shaft 71, and leads to the released state.

Figure 12:
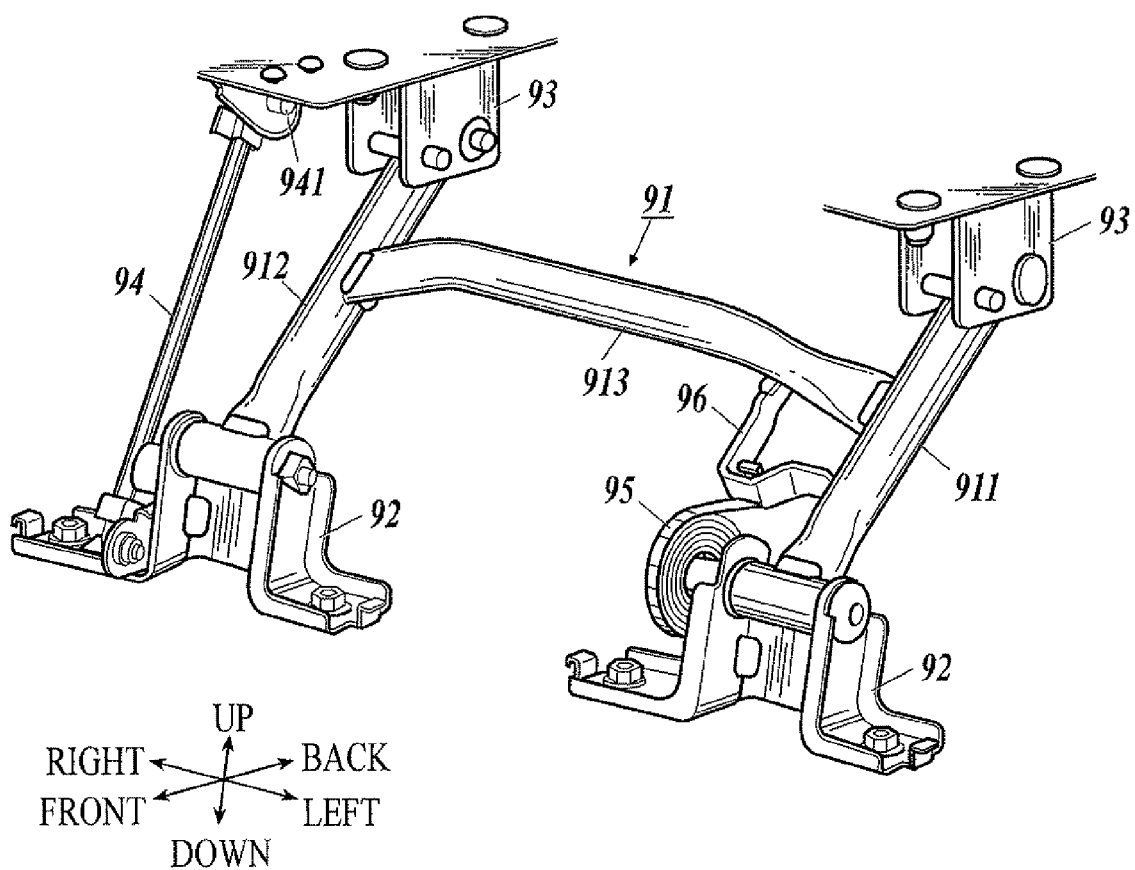
[FIG. 12] This is a perspective view as diagonally viewed from the left front, illustrating the outline configuration of the shift mechanism in the horizontal state of the seat cushion body according to the present embodiment.
Figure 13:
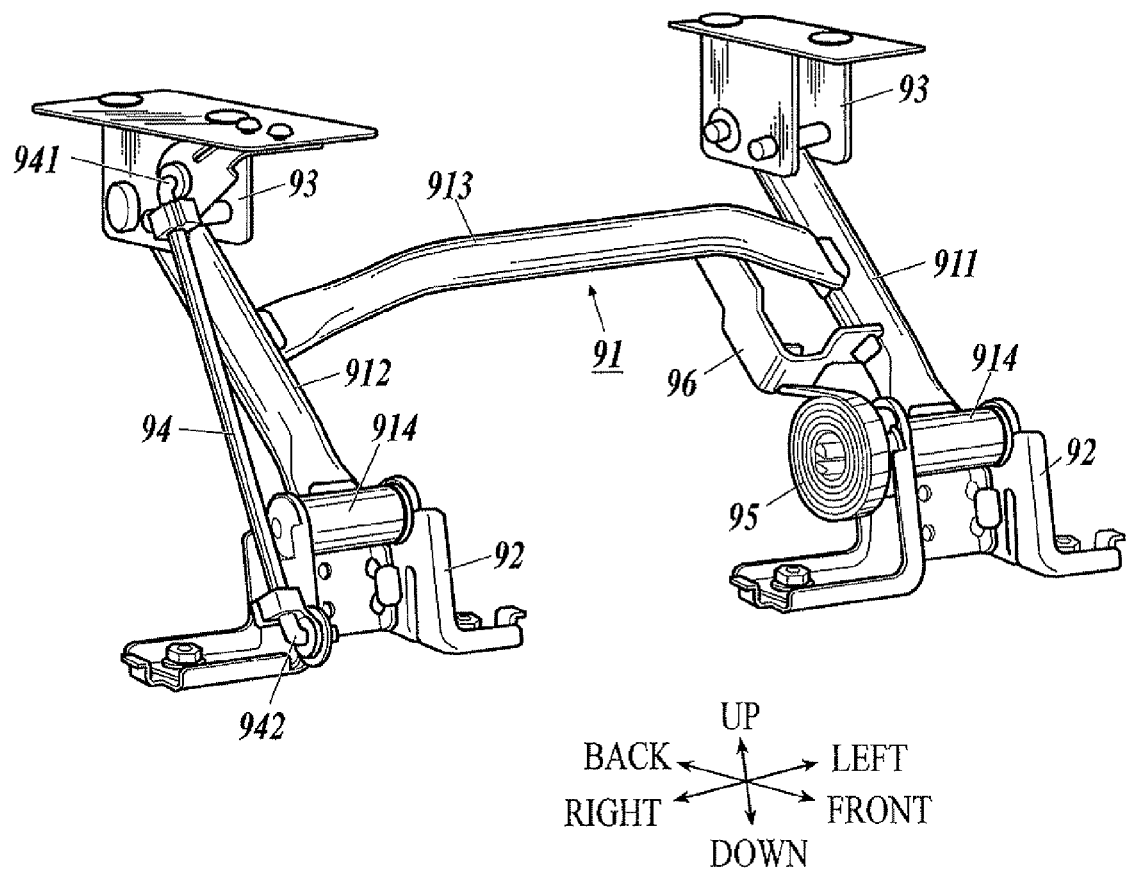
[FIG. 13] This is a perspective view as diagonally viewed from the right front, illustrating the outline configuration of the shift mechanism in the horizontal state of the seat cushion body according to the present embodiment.

The shift mechanism 9 shifts the seat cushion body 7 between the horizontal state and the folded state. FIG. 11 is a front view illustrating an outline configuration of the shift mechanism 9 in the horizontal state of the seat cushion body 7. FIG. 12 is a perspective view as diagonally viewed from the left front. FIG. 13 is a perspective view as diagonally viewed from the right front. As illustrated in FIGS. 11 to 13, the shift mechanism 9 includes a frame unit 91, foot-side bearing units 92, seat-side bearing units 93, a guide member 94, and a rotation urging unit 95.

Figure 14A:
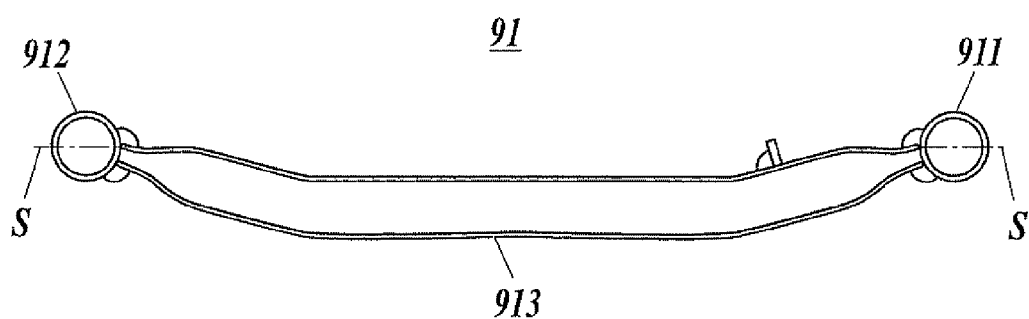
[FIG. 14A] This illustrates an outline configuration of a frame unit according to the present embodiment and is a sectional view of the unit taken along a line a-a in FIG. 14B.
Figure 14B:
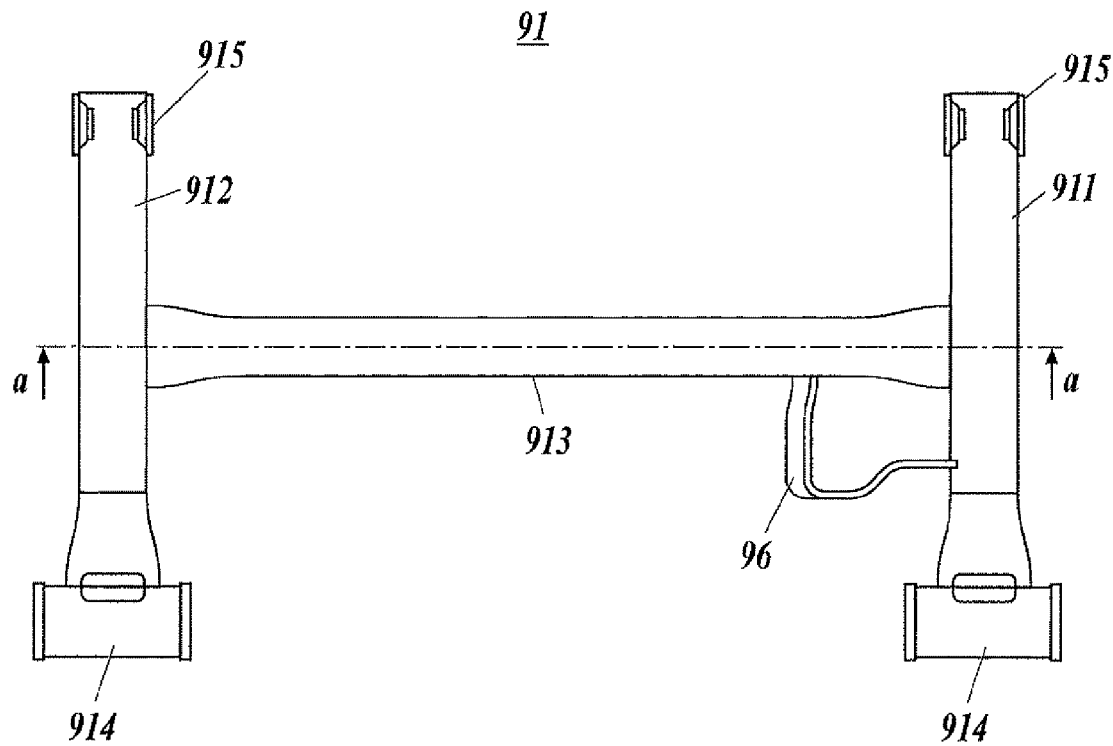
[FIG. 14B] This is a front view illustrating the outline configuration of the frame unit according to the present embodiment.

FIG. 14 illustrates an outline configuration of the frame unit 91. FIG. 14A is a sectional view of the unit taken along a line a-a in FIG. 14B while FIG. 14B is a front view thereof. As illustrated in FIG. 14, the frame unit 91 includes a pair of parallel legs 911 and 912 and a connection frame 913 connecting the paired legs 911 and 912.

In the lower end of each of the legs 911 and 912 composed of a metal pipe, a rotational shaft unit 914 is supported by a foot-side bearing unit 92. In upper ends of the legs 911 and 912, pivot holes 915 for rotatably supporting the legs 911 and 912 at the seat-side bearing units 93 are formed.

The connection frame 913 is attached in the longitudinal center of the paired legs 911 and 912. As illustrated in FIGS.

12 and 13, the connection frame 913 curves so as to project forward in the horizontal state of the seat cushion body 7. As illustrated in FIG. 14A, both ends of the connection frame 913 are fixed by, for example, welding at the positions shifted in the projecting direction of the connection frame 913, from the center S of the cross section orthogonal to the longitudinal direction of the legs 911 and 912.

A bias engagement member 96 for engaging with the rotation urging unit 95 has a substantial L shape viewed from the front and is attached to the left leg 911 and the connection frame 913 by, for example, welding.

As illustrated in FIGS. 11 to 13, a pair of foot-side bearing units 92 is provided for each of the paired legs 911 and 912 and mounted on the foot floor surface 110 at a predetermined interval between the foot-side bearing units 92 in the lateral direction. Seat-side bearing units 93 are provided for the respective legs 911 and 912 and fixed to the undersurface of the seat cushion body 7 at a predetermined interval in the lateral direction. This enables guiding between the horizontal state and the folded state while the paired legs 911 and 912 support the seat cushion body 7.

A guide member 94 is placed outside the paired legs 911 and 912, and on the right, i.e., adjacent to the center of the vehicle. The guide member 94 guides the seat cushion body 7 between the horizontal state and the folded state together with the paired legs 911 and 912. The guide member 94 is formed by bending both ends of a metal round rod. The upper end of the guide member 94 serves as a rotational shaft 941 supported by the seat-side bearing unit 93 in the horizontal position. The lower end of the guide member 94 serves as a rotational shaft 942 supported by the foot-side bearing units 92 in the horizontal position. The rotational shaft 941 of the guide member 94 adjacent to the seat cushion body 7 is placed further forward than the rotational shafts of the paired legs 911 and 912 adjacent to the seat cushion body 7. In contrast, the rotational shaft 942 of the guide member 94 adjacent to the foot floor surface 110 is placed further forward and downward than the rotational shafts of the paired legs 911 and 912 adjacent to the foot floor surface 110. This geometry enables the seat cushion body 7 to be smoothly folded into a substantially horizontal posture during the folded state.

The rotation urging unit 95 applies rotational force to at least one leg 911 of the paired legs 911 and 912 in order to guide the seat cushion body 7 from the horizontal state to the folded state. The rotation urging unit 95 is a flat spiral spring placed inside the paired legs 911 and 912 and at a portion of the leg 911 adjacent to the foot floor surface 110. The rotation urging unit 95 has an inner end fixed to the left foot-side bearing units 92 and an outer end engaging with the bias engagement member 96. In the horizontal state of the seat cushion body 7, the outer end of the rotation urging unit 95 engages with the bias engagement member 96 to apply urging force to the left leg 911. The outer end of the rotation urging unit 95 is detached from the bias engagement member 96 halfway through guiding of the seat cushion body 7 from the horizontal state to the folded state.

Figure 15:
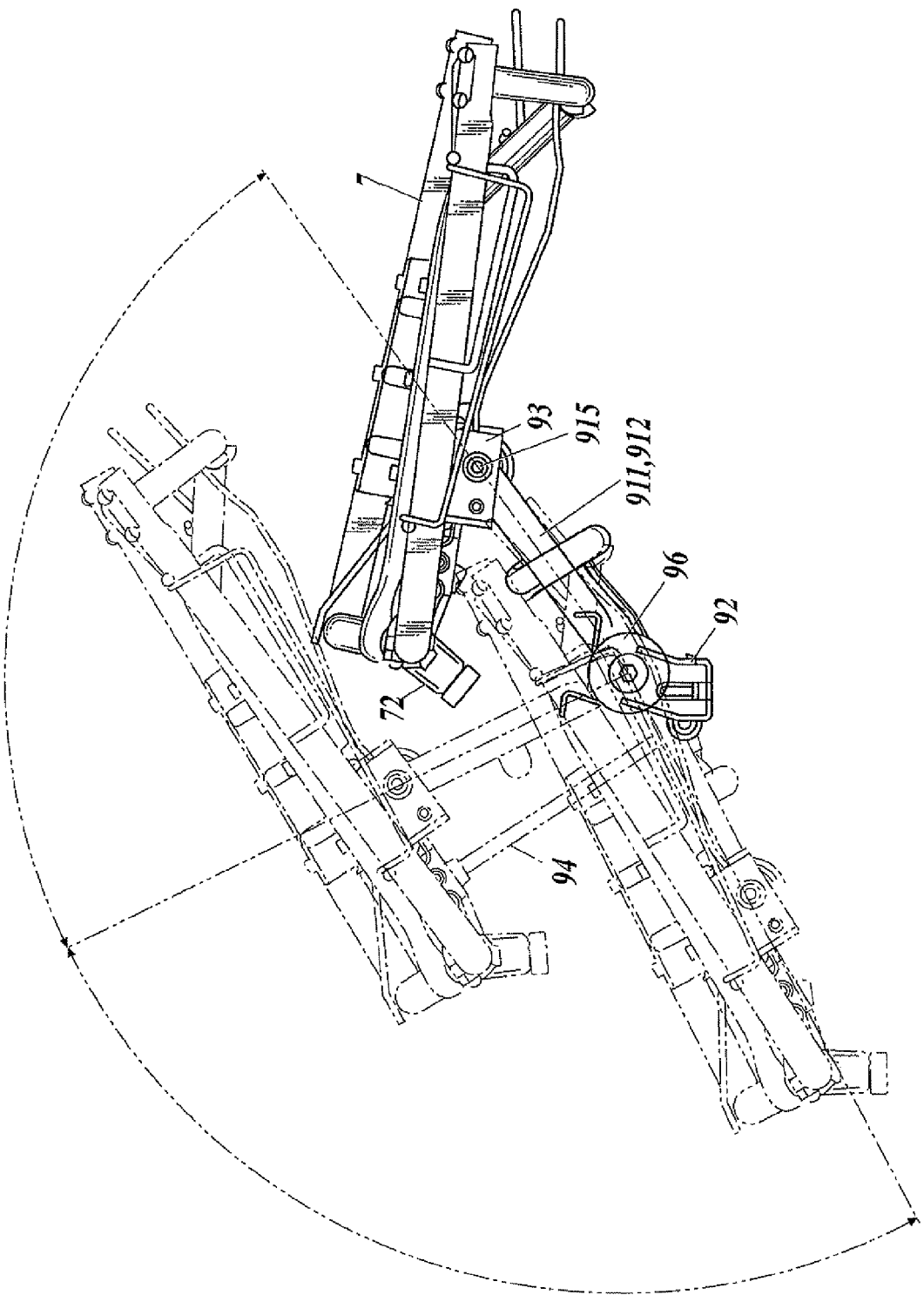
[FIG. 15] This is a schematic side view illustrating the operation of the shift mechanism according to the present embodiment.

A detailed operation of the shift mechanism 9 will be explained. FIG. 15 is a schematic side view illustrating the operation of the shift mechanism 9. Solid lines in FIG. 15 indicate the seat cushion body 7 and the shift mechanism 9 in the horizontal state while two-dot chain lines indicate the seat cushion body 7 and the shift mechanism 9 during a shifting operation. The seat cushion locking mechanism 8 is unlocked from the horizontal state to then release the rotation urging unit 95. As a result, the urging force of the rotation urging unit 95 rotates the legs 911 and 912 forward and also moves the seat cushion body 7 forward. During this movement, the guide member 94 reduces the rattle of the seat cushion body 7. Additionally, the connection frame 913 has a curved shape so as to project forward in the horizontal state of the seat cushion body 7; hence, the space at the center between the connection frame 913 and the seat cushion body 7 can be secured while the paired legs 911 and 912 guide the seat cushion body 7 from the horizontal state to the folded state. This can prevent contact of the connection frame 913 with the seat cushion body 7 in a folding operation and enables to perform a smooth folding operation of the seat cushion body 7. Since the connection frame 913 projects downward after the folding, the seat cushion body 7 can be placed downward to use a space more effectively.

Since the rotation urging unit 95 is detached from the bias engagement member 96 halfway through the guiding of the seat cushion body 7 from the horizontal state to the folded state, no urging force is applied to the paired legs 911 and 912 after the detaching to move the seat cushion body 7 with a decrease in the rotational force. As a result, the posture maintenance unit 72 comes into contact with the foot floor surface 110 to then complete the shifting operation and lead to the folded state of the seat cushion body 7. During the folded state, the seat cushion body 7 is maintained in a substantially horizontal posture by the guide member 94 and the posture maintenance unit 72.

Figure 16:
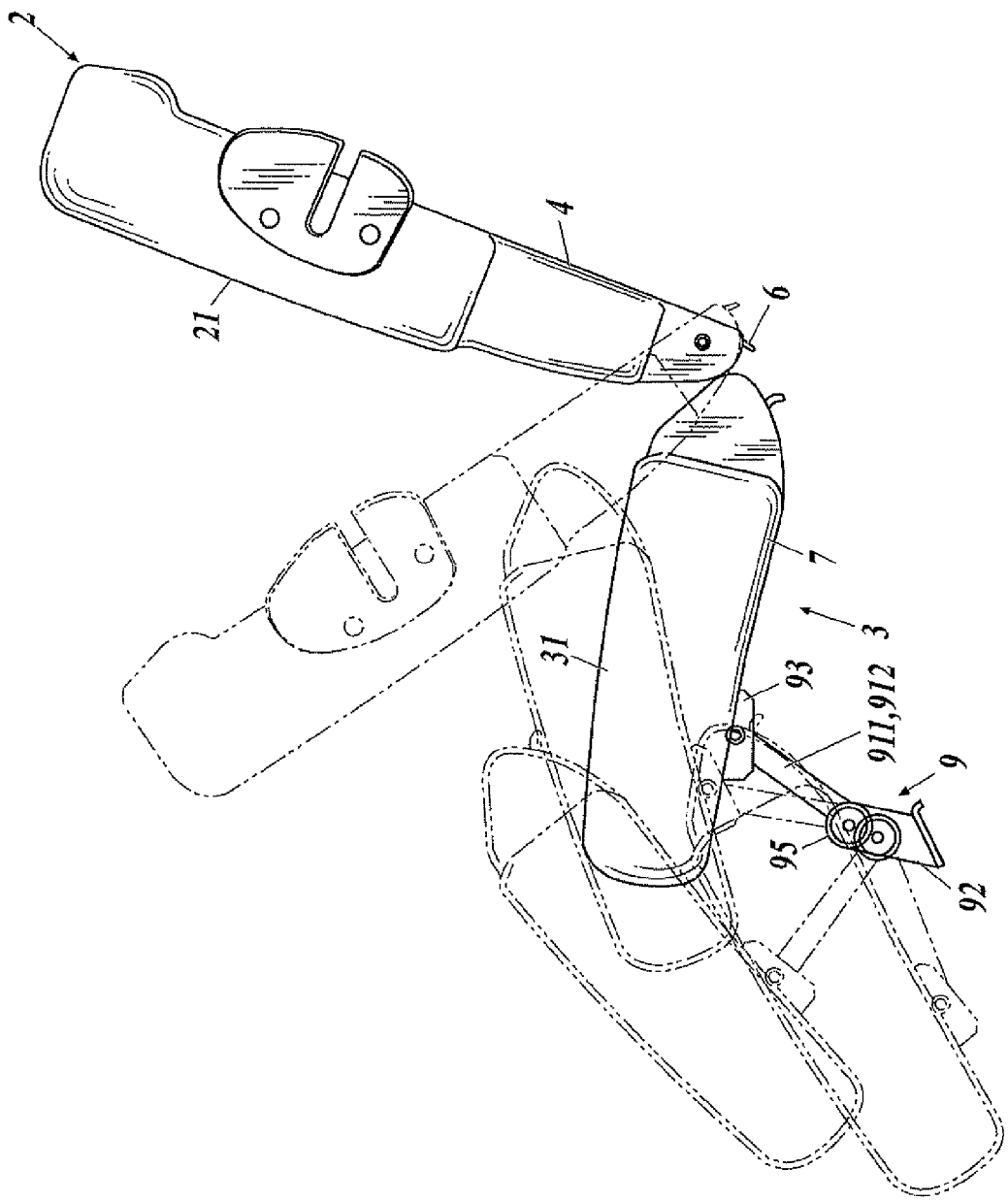
[FIG. 16] This is a schematic side view illustrating the operation of a seat back unit and a seat cushion unit according to the present embodiment.

The cooperation during the folding operation of the seat back unit 2 and the seat cushion unit 3 will be explained. FIG. 16 is a schematic side view illustrating the operation of the seat back unit 2 and the seat cushion unit 3. Solid lines in FIG. 16 indicates the seat back unit 2 and the seat cushion unit 3 in the seatable state (horizontal state) while two-dot chain lines indicate the seat back unit 2 and the seat cushion unit 3 during the folding operation. If the seat back locking mechanism 5 is unlocked from the seatable state to tilt the seat back body 4, the rocking member 6 unlocks the seat cushion locking mechanism 8 before the complete folding. This applies the urging force of the rotation urging unit 95 to the paired legs 911 and 912 to rotate the paired legs 911 and 912. Thereby, the seat cushion body 7 shifts from the horizontal state to the folded state. If the seat cushion body 7 reaches the folded state, the user folds the seat back body 4 completely to complete the folding operation.

According to the present embodiment, the auxiliary cutout 816 extends from the lower end of the cutout 815; hence, the lock shaft 71 enters the auxiliary cutout 816 if a luggage clashes with the back side to move the entire rear seat 1 forward. Since upward movement of the lock shaft 71 is regulated by the entry into the auxiliary cutout 816, the seat cushion body 7 itself is also locked in the horizontal state. In this way, even if a luggage clashes with the back side to tilt the seat back body 4, the seat cushion body 7 maintains the locked state. This can prevent unlocking in cooperation with the tilt of the seat back body 4.

The hamper 84 occluding the auxiliary cutout 816 is provided to prevent the lock shaft 71 from entering the auxiliary cutout 816; hence, the lock shaft 71 can be prevented from entering the auxiliary cutout 816 in a normal mode.

The hamper 84 deforms and opens the auxiliary cutout 816 if a load equal to or greater than the predetermined level is applied to the hamper 84 due to shock such as collision; hence, the lock shaft 71 can be fit into the auxiliary cutout 816 to lock the seat cushion body 7 only when a luggage clashes from behind from the back to tilt the seat back body 4.

The hamper 84 includes a plate spring projecting upwards to occlude the auxiliary cutout 816; hence, shock caused by a load smaller than the predetermined level is absorbable even if the lock shaft 71 collides with the hamper 84 due to a certain factors other than collision with the back side.

The predetermined load can be easily adjusted just by modifying the thickness or elastic modulus of the plate spring of the hamper 84.

The inverted V hamper 84 has one end 842 fixed at the bottom 813 of the base plate 81 and the other end 843 separated from the bottom 813 of the base plate 81; hence, the deformation of the hamper 84 due to collision with the lock shaft 71 causes the contact of the other end 843 with the bottom 813. This two-stage process can hold the lock shaft 71 so as to prevent a load smaller than the predetermined level from opening the auxiliary cutout 816.

The detachment stopper 85 prevents detachment of the hamper 84 from the base plate 81 due to the deformation of the hamper 84 to reliably guide the contact between the other end 843 of the hamper 84 and the bottom 813 of the base plate 81.

If a vehicle collides head-on due to, for example, an accident, a luggage on a loading space behind a rear seat may clash against the back of a seat back. For such cases, even a tiltable seat back such as a stowable rear seat preferably has a wall with a certain level of strength.

In the present embodiment to meet this request, the seat back frames 41 in the paired seat back bodies 4 has the reinforcing members 47a and 47b so as to surround the hinge units 44 adjacent to the other seat back body 4, i.e., adjacent to the center of the vehicle; hence, shock caused by a luggage on the loading space clashing with the back side can be endured to secure the strength of the wall of the seat back unit 2.

The reinforcing member 47a surrounds the wire 46a adjacent to the other seat back body 4 in the paired wires 45a and 46a for mounting a child safety seat; hence, the strength of the wire 46a can also be enhanced by the single reinforcing member 47a.

In recent years, mechanisms have been developed which move a seat cushion to a foot floor surface in cooperation with the tilting operation of a seat back. Such mechanisms however should ensure a smooth operation of the seat cushion.

In the present embodiment to meet this request, the connection frame 913 has a curved shape so as to project forward in the horizontal state of the seat cushion body 7; hence, the space at the center between the connection frame 913 and the seat cushion body 7 can be secured while the paired legs 911 and 912 guide the seat cushion body 7 from the horizontal state to the folded state. This configuration can prevent contact of the connection frame 913 with the seat cushion body 7 in a folding operation and perform a smooth folding operation for the seat cushion body 7.

Additionally, the connection frame 913 projects downward after the folding; hence the seat cushion body 7 can be placed downward to use a space more effectively.

The connection frame 913 is fixed at the position shifted in the projecting direction of the connection frame 913, from the center of the cross section orthogonal to the longitudinal direction of the legs 911 and 912; hence, the connection frame 913 can be attached to the legs 911 and 912 more easily in the assembling work.

The present invention can also be applicable to any other embodiment other than the above embodiments. Proper modifications can be applied without departing from the scope and spirit of the present invention.

For example, the embodiment described above exemplifies the auxiliary cutout 816 extending forward. Alternatively, if the direction of the load by shock from the back of the seat back body 4 is different from the anteroposterior direction, the auxiliary cutout 816 is preferably parallel to the direction of the load. Thereby, when the entire stowable rear seat 1 moves in response to shock from the back, the lock shaft 71 can easily be fit into the auxiliary cutout 816.

Figure 17:
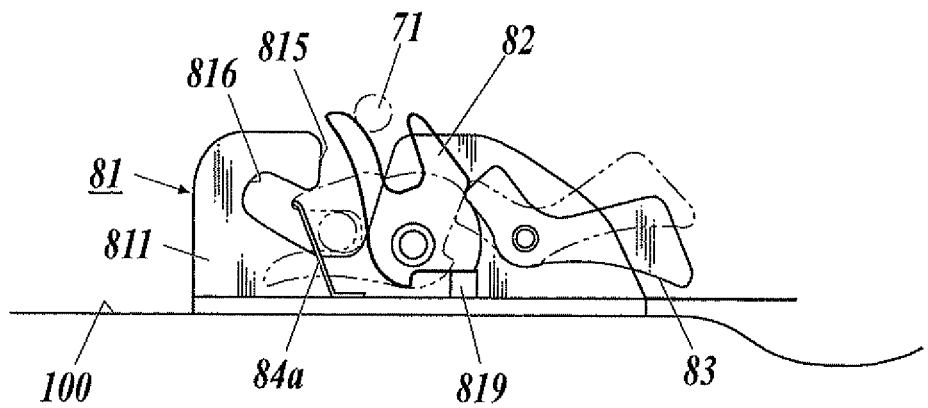
[FIG. 17] This is a side view illustrating a modification of a hamper in FIG. 8.

As illustrated in. FIG. 17, the inverted V hamper 84 can be replaced with a hamper 84a including a plate spring projecting upwards so as to occlude the auxiliary cutout 816.

Figure 18:
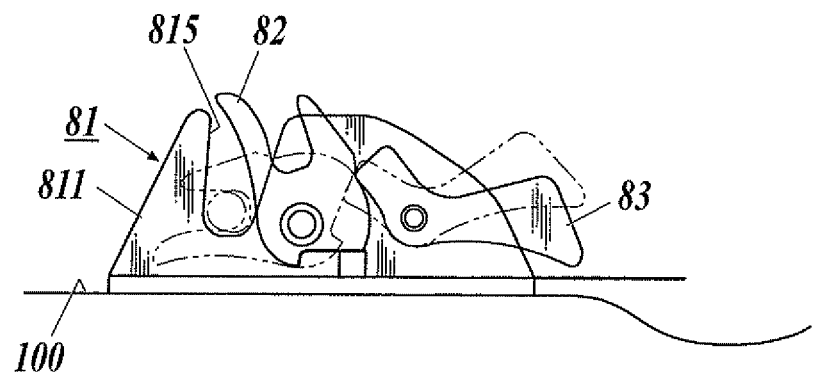
[FIG. 18] This is a side view illustrating a modification of a base plate in FIG. 8.

If collision from the back is ignored, the auxiliary cutout 816 and the hamper 84 may be omitted as illustrated in FIG. 18. This can reduce the production steps and the parts of the base plate 81.

The preceding embodiment exemplifies the guide member 94 composed of a round rod, but maybe any other rod such as a square rod or a pipe beside the round rod.

DESCRIPTION OF REFERENCE NUMERALS

1 stowable rear seat
2 seat back unit
3 seat cushion unit
4 seat back body
5 seat back locking mechanism
6 rocking member
7 seat cushion body
8 seat cushion locking mechanism
9 shift mechanism
21, 31 seat pads
41 seat back frame
42 back board
43, 44 hinge unit
45a, 46a wire
45b, 46b wire
47a reinforcing member
47b reinforcing member
51 lever
52 lock unit
71 lock shaft
72 posture maintenance unit
81 base plate
82 regulation pawl
83 rachet unit
84 hamper
85 detachment stopper
91 frame unit
92 foot-side bearing unit
93 seat-side bearing unit
94 guide member
95 rotation urging unit
96 bias engagement member
100 floor surface
101 support bracket
102 center hinge bracket
110 foot floor surface
115 latched portion
811 plate board
812 screw
813 bottom
814 plate body
815 cutout
816 auxiliary cutout
817 first rotational shaft
818 second rotational shaft
819 stopper
821 concave portion
822 urging spring
823 cam surface
824 first cam surface 825 second cam surface
831 one end
832 cam surface
833 upper portion
834 lower portion
835 other end
836 first urging surface
837 second urging surface
841 one side
842 one end
843 other end
911, 912 leg
913 connection frame
914 rotational shaft unit
915 pivot hole
941 rotational shaft
942 rotational shaft

The invention claimed is:

1. A stowable rear seat, comprising:
a seat back unit; and
a seat cushion unit, wherein
the seat back unit comprising:
   a tiltable seat back body erecting on a floor surface;
   a seat back locking mechanism for locking a tilt of the seat back body; and
   a rocking member provided at a lower end of the seat back body, the rocking member rocking in an anteroposterior direction in cooperation with a tilting operation of the seat back body after unlocking of the seat back locking mechanism;
the seat cushion unit comprising:
   a seat cushion body horizontally placed on the floor surface in front of the seat back body, the seat cushion body being foldable on a foot floor surface at a lower position than the floor surface;
   a lock shaft provided at a back end of the seat cushion body; and
   a seat cushion locking mechanism provided in the floor surface, the seat cushion locking mechanism engaging with the lock shaft in a regulated state to lock a horizontal state of the seat cushion body on the floor surface;
the seat cushion locking mechanism comprising:
   a base plate having a cutout vertically extending and an upper part thereof opened such that the lock shaft is movable forward and backward;
   a regulation pawl rotatably attached to the base plate, rotated urged by the lock shaft entering the cutout, occluding an upside of the lock shaft after entry of the lock shaft up to a lower end of the cutout to regulate upward movement of the lock shaft and maintaining the horizontal state of the seat cushion body;
   a ratchet unit rotatably attached to the base plate and engaging with the regulation pawl to thereby lock the regulated state of the regulation pawl, the regulated state being able to be released through contact between the rocking member and the ratchet unit; and
   an auxiliary cutout extending forward continuously from the cutout at the lower end of the cutout.

2. The stowable rear seat according to claim 1, wherein the auxiliary cutout is parallel to a direction of a shock load from a back of the seat back body.

3. The stowable rear seat according to claim 1, wherein
the base plate has a hamper for occluding the auxiliary cutout to prevent the lock shaft from entering the auxiliary cutout, and
the hamper deforms due to a load equal to or greater than a predetermined level applied to the hamper and opens the auxiliary cutout.

4. The stowable rear seat according to claim 3, wherein the hamper includes a plate spring projecting upward to occlude the auxiliary cutout.

5. The stowable rear seat according to claim 4, wherein
the hamper has an inverted V shape, and
the hamper has one end fixed at the bottom of the base plate and the other end separated from the bottom of the base plate.

6. The stowable rear seat according to claim 5, further comprising a detachment stopper for preventing detachment of the hamper from the base plate due to the deformation of the hamper.

7. The stowable rear seat according to claim 1, wherein
one pair of the seat back bodies is provided so as to be adjacent to each other at right and left;
each of the paired seat back bodies comprising:
a seat back frame; and
hinge units provided in the right and left lower ends of the seat back frame, the hinge units being rotatably supported by the floor surface such that the seat back frame is tiltable, and
each seat back frame of the paired seat back bodies has a reinforcing member provided thereto so as to surround the hinge unit adjacent to the other seat back body.

8. The stowable rear seat according to claim 7, wherein
each seat back frame of the paired seat back bodies has a pair of right and left wires for mounting a child safety seat,
the wires of at least one seat back body of the paired seat back bodies being placed at the right and left lower ends of the seat back body, and
the reinforcing member of at least one of the seat back bodies surrounds the wire adjacent to the other seat back body.

9. The stowable rear seat according to claim 1, further comprising:
a shift mechanism for shifting the seat cushion body between the horizontal state on the floor surface and a folded state on the foot floor surface, wherein
the shift mechanism comprising:
a pair of right and left legs rotatably attached to the seat cushion body and the foot floor surface, the paired legs rotating relative to the foot floor surface in the anteroposterior direction to support the seat cushion body so as to guide the seat cushion body between the horizontal state on the floor surface and the folded state on the foot floor surface; and
a connection frame bridging the paired legs, and
the connection frame curving so as to project forward in the horizontal state of the seat cushion body on the floor surface.

10. The stowable rear seat according to claim 9, wherein
the connection frame is attached in the longitudinal center of the paired legs, and
both ends of the connection frame are fixed at the positions shifted in the projecting direction of the connection frame, from the center of the cross section orthogonal to the longitudinal direction of the legs.

* * * * *